United States Patent [19]
Yergenson

[11] Patent Number: 5,268,823
[45] Date of Patent: Dec. 7, 1993

[54] LIGHT TRANSMISSION APPARATUS FOR ELECTRO-OPTICALLY COUPLING TO A DISPLAY PANEL FOR AN ELECTRONIC INSTRUMENT

[75] Inventor: Robin P. Yergenson, Meridian, Id.

[73] Assignee: Hewlett-Packard Company, Palo Alto, Calif.

[21] Appl. No.: 984,035

[22] Filed: Dec. 1, 1992

[51] Int. Cl.$^5$ ............................................. F21V 7/04
[52] U.S. Cl. ...................................... 362/32; 362/26; 362/800; 340/815.31
[58] Field of Search .................... 362/32, 433, 800, 26, 362/27; 340/815.31

[56] References Cited

U.S. PATENT DOCUMENTS

| | | | |
|---|---|---|---|
| 3,142,235 | 7/1964 | Siegmund | 362/32 |
| 3,439,157 | 4/1969 | Myles | 362/32 |
| 4,141,058 | 2/1979 | Mizohata et al. | 362/32 |
| 4,431,966 | 2/1984 | Pucciarello . | |
| 4,555,694 | 11/1985 | Yanagishima et al. | 362/26 |
| 4,933,818 | 6/1990 | Eckmann | 362/32 |
| 5,043,716 | 8/1991 | Latz et al. | 340/815.31 |
| 5,053,765 | 10/1991 | Sonehara et al. | 340/815.31 |

Primary Examiner—Richard A. Bertsch
Assistant Examiner—Michael I. Kocharov

[57] ABSTRACT

Light transmission and alignment apparatus for electro-optically coupling to electronic instrument display panels and including a plurality of light emitting diodes mounted on one major surface of a printed circuit board aligned within an electronic instrument housing. A plurality of light pipes are coupled, respectively, between the plurality of light emitting diodes and a display panel on an outer surface of the electronic instrument housing. The light pipes are joined in a one piece molded construction to orthogonally positioned frame members which are received by the printed circuit board for aligning the light pipes in all of the X, Y, and Z axes within the instrument housing. The light pipes are gently curved upwardly and outwardly from the LEDs on the adjacent PC board major surface and along a 90° radius of curvature to lens on the display panel. These light pipes are also tapered from a larger light receiving end to a smaller light projecting end which operates to couple light directly to symbols or characters on the display panel.

20 Claims, 5 Drawing Sheets

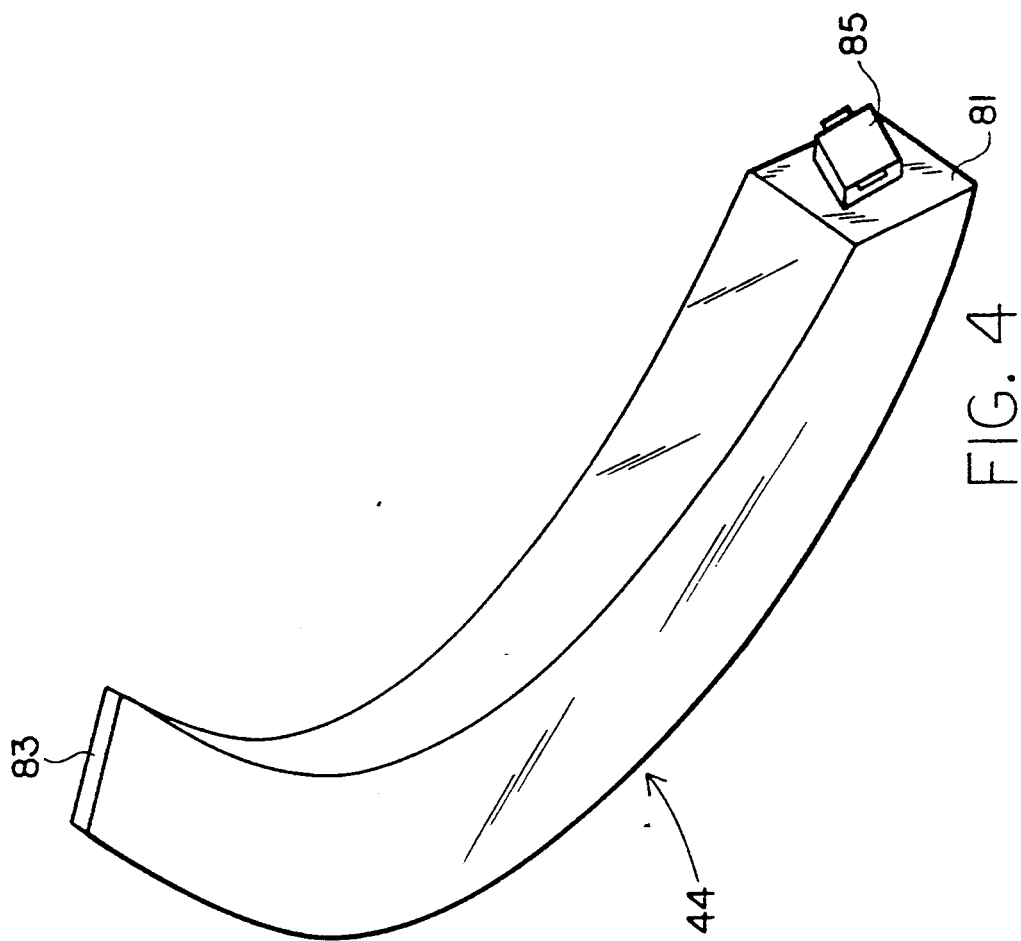

LIGHT TRANSMISSION APPARATUS FOR ELECTRO-OPTICALLY COUPLING TO A DISPLAY PANEL FOR AN ELECTRONIC INSTRUMENT

TECHNICAL FIELD

This invention relates generally to the electro-optical coupling to display panels for certain electronic instruments from the internal electronics thereof. More particularly, this invention relates to the use of light pipes to create a novel and cost effective design and construction for the opto-electronics of computers, printers, copiers, or other similar electronic equipment.

BACKGROUND ART

Present manufacturing processes used for the design and construction of certain types of printers and copiers require the use of dedicated printed circuit boards (PCBs) for electro-optically coupling to and driving a display panel located within an adjacent surface area of the printer or copier housing. Typically, these dedicated printed circuit boards have light emitting diodes (LEDs) thereon which are mounted just beneath the display panel, and short straight light pipes are used to couple light from the LEDs to letters, numbers or symbols on the display panel.

Whereas the above prior art approach to electro-optical coupling to display panels for printers and copiers provides a cosmetically acceptable design and satisfactory electro-optical coupling between the LEDs and the display panels, the requirement for a dedicated printed circuit board for carrying the light emitting diode arrays adds significant cost and complexity to the printer and copier electronics. In addition, the dedicated PCB requirement carries with it the additional requirement for dedicated cabling for making necessary electrical connections to the LED-supporting printed circuit board. All of the above requirements add significant additional manufacturing costs to these printers and copiers in the highly price-competitive fields of this electronic instrumentation, and it is the solution to this problem of cost and complexity to which the present invention is directed.

DISCLOSURE OF INVENTION

The general purpose and principal object of the present invention is to provide a novel alternative approach and construction with respect to the above prior art design and also to provide a new apparatus which has completely eliminated the requirement for the above described LED-dedicated printed circuit board.

Another object of this invention is to provide a new and improved light transmission apparatus of the type described which significantly reduces the cost and complexity of both the mechanical and the electrical design for the internal components and circuitry for printers, copiers, computers and the like which utilized LED type electro-optical coupling to display panels.

Another object of this invention is to provide a new and improved light transmission apparatus of the type described in which no additional parts are required for light pipe alignment or to compensate for large clearances due to tolerance stacks.

Another object of this invention is to provide a new and improved light transmission apparatus of the type described which operates to minimize light transmission losses due to poor LED/light pipe alignment or as a result of poor light transmission through additional parts.

A feature of this invention is the provision of a new and improved light transmission apparatus of the type described which is operative to ensure tight position control of the light pipes relative to the horizontal surface on top of the electronic instrument enclosure. This feature also ensures an aesthetically pleasing design.

Briefly summarized, the above purpose, objects, and various related advantages of this invention are achieved by the provision of a light transmission apparatus which includes a plurality of light emitting diodes (LEDs) located on one major surface of an internal printed circuit board which is vertically and orthogonally positioned with respect to a horizontal display panel surface an electronic instrument housing. A plurality of light pipes are electro-optically coupled to and extended between the LEDs and characters or symbols located on the display panel surface. In a preferred embodiment of the invention, the plurality of light pipes are joined in a one piece molded construction to both horizontal and vertical frame members which operate to precisely align the light pipes in the X, Y, and Z axes of orientation within the electronic instrument housing.

Another novel feature of this invention is the provision of a new and improved light pipe construction, per se, which is uniquely adapted for efficiently changing the light path direction from a horizontal direction emanating from a vertically positioned printed circuit board within an electronic instrument housing to a vertical direction and into the display panel on an upper surface of the housing. This light pipe construction has an approximate 90° radius of curvature, R, which is equal to or greater than three times the maximum thickness, t, of the light pipe, or $R \geq 3t$.

Another novel feature of this invention is the provision of a novel light pipe construction of the type described wherein the end of the light pipe mating with the LED is preferably flat, as is the light output end of the pipe which projects into the instrument display panel. Light pipes constructed in accordance with the above parameters have been found to exhibit a good light transmission efficiency and to also exhibit good misalignment tolerances in all of the X, Y, and Z directions.

The present invention as briefly summarized above, together with its many advantages and novel features, will become more readily apparent and understood with reference to the following description of the accompanying drawings.

BRIEF DESCRIPTION OF THE DRAWINGS

FIG. 2 shows the LED mounting arrangement on the printed circuit board and the light pipe coupling from the LEDs and along an approximate 90° curved path to the top of the printer or copier housing.

FIG. 4 is a perspective view of a single light pipe to better illustrate its precise external contours and to show a light emitting diode located adjacent to the lower end of the light pipe.

DETAILED DESCRIPTION OF THE PREFERRED EMBODIMENT

Figure 1A:
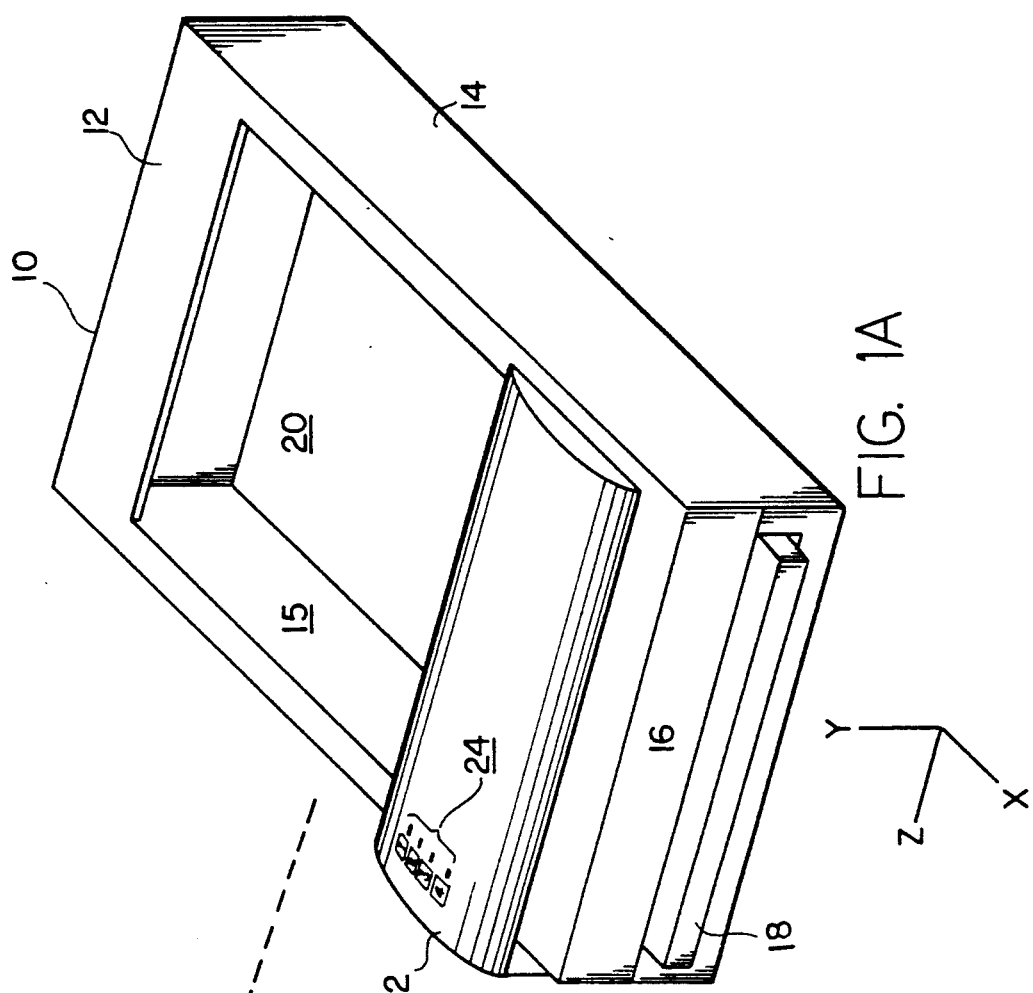
FIG. 1A is a perspective view of a printer or copier housing in which the present invention may be used.

Referring now to FIG. 1A, there is shown a printer or copier housing 10 which will typically include a top wall 12, side walls 14 and 15, and a front wall 16 of conventional construction. In the case of a printer and in the example herein as shown in FIG. 1, an input paper cassette 18 is received in an opening in the front wall 16, and printed sheets of paper are collected in an output sheet receiving tray or bin 20.

The section 22 of the printer 10 which is bounded by the far side wall 15 is configured to receive internal thereto the light pipe apparatus shown in the enlarged perspective view of FIG. 1B and also in plan view in FIG. 2 described below. This section 22 includes a display panel 24 therein, and this display panel may contain letters, numbers (e.g. 1, 2, 3, 4 code numbers), or symbols which are lighted by the selective energization of the LEDs on the PC board described below. The code numbers 1, 2, 3, 4 are merely representative of four (4) parameters of printer or copier operation which provide a visual indication to the user of the presence or absence of certain operating conditions of the printer or copier.

Figure 1B:
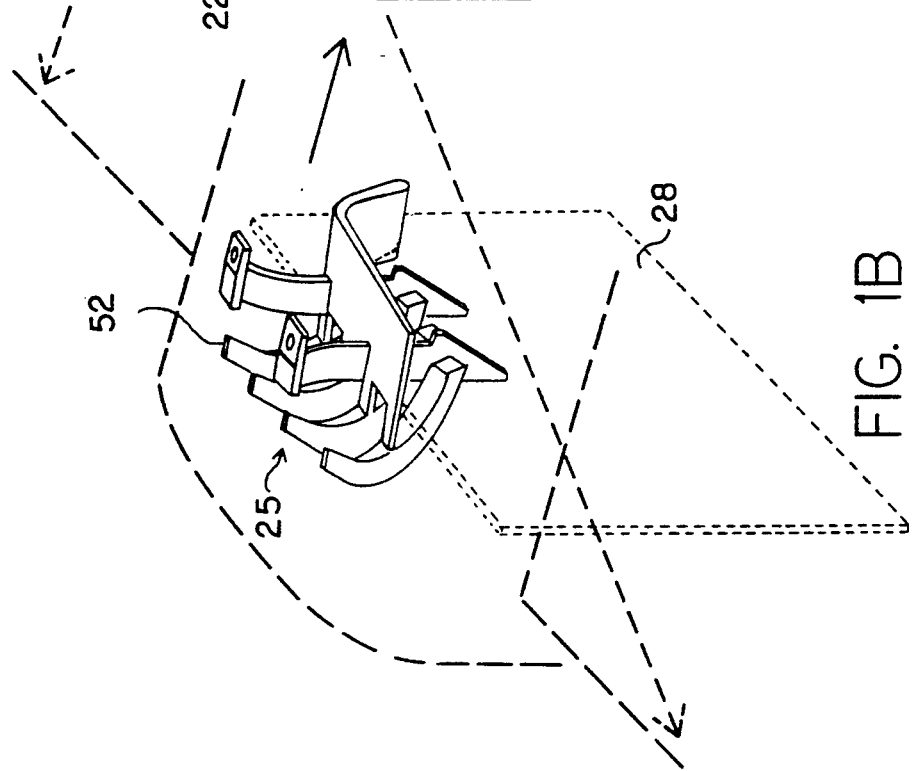
FIG. 1B is an enlarged perspective view showing the one piece molded light pipe construction as it is oriented vertically within the electronic instrument housing of FIG. 1A, and with the beveled edges of the vertical frame pieces abutting the far surface of the printed circuit board.

Referring now to FIG. 1B, there is shown an enlarged perspective view of how the one piece molded light pipe assembly 25 is mounted on a top section of a printed circuit board 28, both of which are described in greater detail below. The upper ends of the four curved light pipes, e.g. light pipe 52, are optically coupled respectively into the four display lens, e.g. lens code number 1, in the display panel 24 in FIG. 1A. These light emitting diodes (LEDs) 30, 32, 34, and 36 shown in the remaining figures are selectively energized by electrical signals received from the PC board 28 to in turn propagate light upwardly in each of these light pipes and into the lens (1, 2, 3, 4) within the display panel 24.

Figure 2:
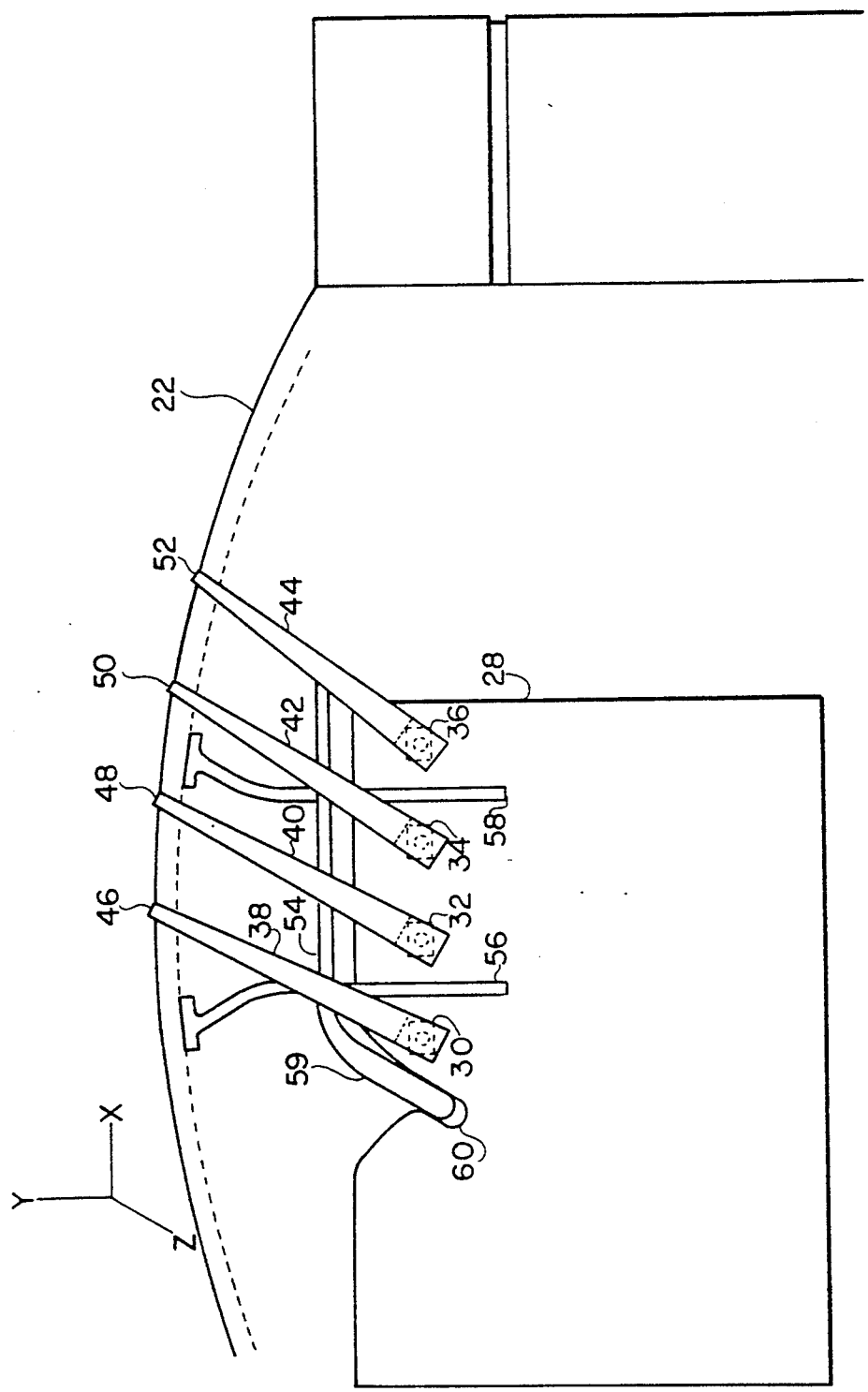
FIG. 2 is a plan view looking from left to right into the left hand side of the printer or copier shown in FIG. 1A and toward the far facing surface of the PC board shown in FIG. 1B.

Referring now to FIG. 2, there is shown a plan view looking into the far facing side of the printed circuit board 28 in FIG. 1B which is vertically aligned as shown within the printer housing 10. The printed circuit board 28 is multi-functional in purpose and operation in that it has been previously set and connected in place using only one set of electrical cabling within the instrument housing 10. Thus, the PC board 28 is used for also performing other electronic signal processing functions in addition to the electro-optical ones described herein. In accordance with the present invention, the printed circuit board 28 will now include, in addition to its previously existing components and functions, a plurality of light emitting diodes 30, 32, 34, and 36 mounted as shown in the upper right hand corner of the PC board 28. Each LED is electro-optically coupled to a corresponding one of a plurality of curved light pipes 38, 40, 42, and 44, respectively. These light pipes 38, 40, 42, and 44 are of a tapered configuration as shown, with the light output ends 46, 48, 50, and 52 thereof extending into individual output display lens areas of the top region 22 of the electronic instrument housing 10.

The light pipes 46, 48, 50, and 52 are preferably constructed of a polycarbonate material and are joined together in a one-piece molded construction which includes a single horizontal cross piece or frame member 54 and two alignment pieces or frame members 56 and 58. The vertical frame members 56 and 58 are formed in the configuration shown and are used to align the light pipes in the Z axis, or perpendicular to the plane of the printed circuit board 28. The horizontal cross piece 54 has a downwardly contoured and angled end portion 59 which is received in a mating U-shaped slot 60 in the PC board 28 for aligning the light pipes 38, 40, 42, and 44 perpendicular to both the X and Y components of the light pipes within the instrument housing 10. This feature allows relative motion along the X and Y components of the light pipes where they are most tolerant of misalignment. The alignment frame members 56 and 58 extend vertically as shown adjacent to the abutting major surface of the PC board 28 and have beveled edges described below which operate to provide a slight physical separation between the lower ends of the light pipes 38, 40, 42, and 44 and the LEDs 30, 32, 34, and 36.

Thus, in operation, when electrical signals are selectively applied to the light emitting diodes 30, 32, 34, and 36, these LEDs serve to propagate light upwardly through the light pipes 38, 40, 42, and 44 and along an approximate 90° radius of curvature and into the code 1-4 lens areas on the upper surface 26 of the printer or copier housing 10 which cover the smaller upper light projecting ends 46, 48, 50, and 52 of these light pipes.

Figure 3B:
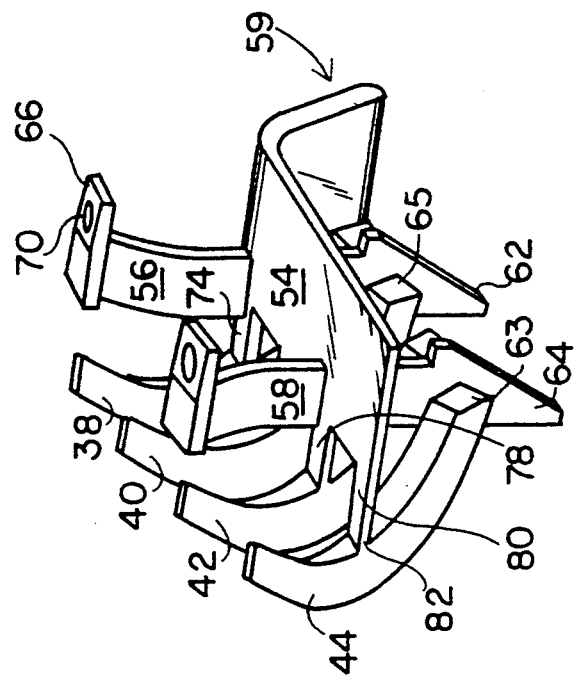
FIG. 3B is a reverse angle perspective view of the one piece molded construction for the light pipe arrangement shown in FIG. 3A.
Figure 3A:
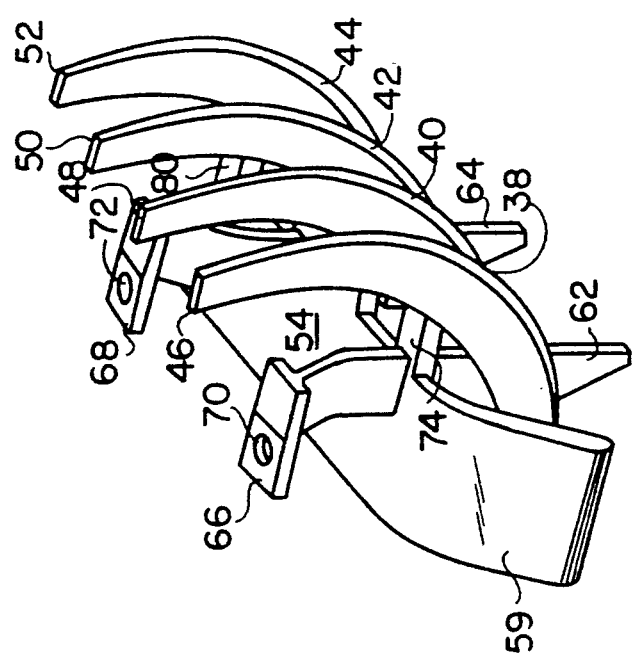
FIG. 3A is an enlarged perspective view showing the one piece molded construction for the light pipes and supporting frame members therefor and removed from the printed circuit board of FIG. 1B.

Referring now to both FIGS. 3A and 3B, there is shown in two oppositely oriented perspective views the one piece molded part in which the plurality of upwardly curved light pipes 38, 40, 42, and 44 are integrally attached to the horizontal support member or platform 54 having the downwardly extending flange 59 which is contoured to engage the mating angled slot 60 in the printed circuit board 28 shown in FIG. 2. The pair of vertical upstanding rib members 56 and 58 are also integrated into the one piece molded construction 25 and include the downwardly extending beveled ends 62 and 64 which are operative to receive the upper edges of the printed circuit board 28 as the assembly 25 is positioned in place as shown in FIG. 1B and FIG. 2. This edge-to-PC board abutment serves to gradually separate the printed circuit board 28 from the lower ends of the light pipes 38, 40, 42, and 44 and thereby provide a small space of about 0.020 inches between these light pipe ends and the corresponding facing surfaces of the light emitting diodes 30, 32, 34, and 36. This feature thus provides the assembly tolerances which are necessary to prevent damage to the LEDs 30, 32, 34, and 36.

The upper ends of the upstanding rib members 56 and 58 include the flat plate fixtures 66 and 68 having therein openings 70 and 72, respectively, for being bolted to the upper surface of an instrument housing 10. This bolting to the upper cover 22 of the instrument housing 10 is done prior to aligning the cover 22 to the printed circuit board 28. In this manner, the instrument assembler can readily ease the angled extended flange 59 into the mating receiving slot 60 on the PC board 28 by self alignment without actually seeing this 59-60 fitting and with the cover 22 being oriented in the visually shielding position shown in FIG. 1A. Each individual light pipe 38, 40, 42, and 44 is integrally joined to the horizontal support member or platform 54 by means of a plurality of horizontally extending rib members 74, 76, 78, and 80, each of which extend into direct and integral contact with the respective light pipes at approximately the center point 82 of the 90° radius of curvature for each these light pipes. As seen in FIG. 3B, the light receiving ends, e.g. 63 and 65, of the light pipes are preferably flat in order to minimize transmission losses due to misalignment with the centers of the respective LEDs 30, 32, 34, and 36.

Referring now to FIG. 4, there is shown in an enlarged perspective view a single light pipe 44 in order to better illustrate the exact shape and contour of each pipe. FIG. 4 shows the 90° radius of curvature from the light receiving face 81 to the light projecting face 83. FIG. 4 also shows the taper of the light pipe from an area of 4×5 millimeters at the light receiving end 81 down to an area of 1.5×4 millimeters at the light projecting end 83 thereof. The light receiving face 81 is located very closely adjacent to the LED 85 as previously indicated, and the light pipe 44 will preferably be constructed of a polycarbonate material such as a material sold under the tradename LEXAN Color No. 111-N and available from the Plastics Division of the General Electric Company.

Figures 5A, 5B:
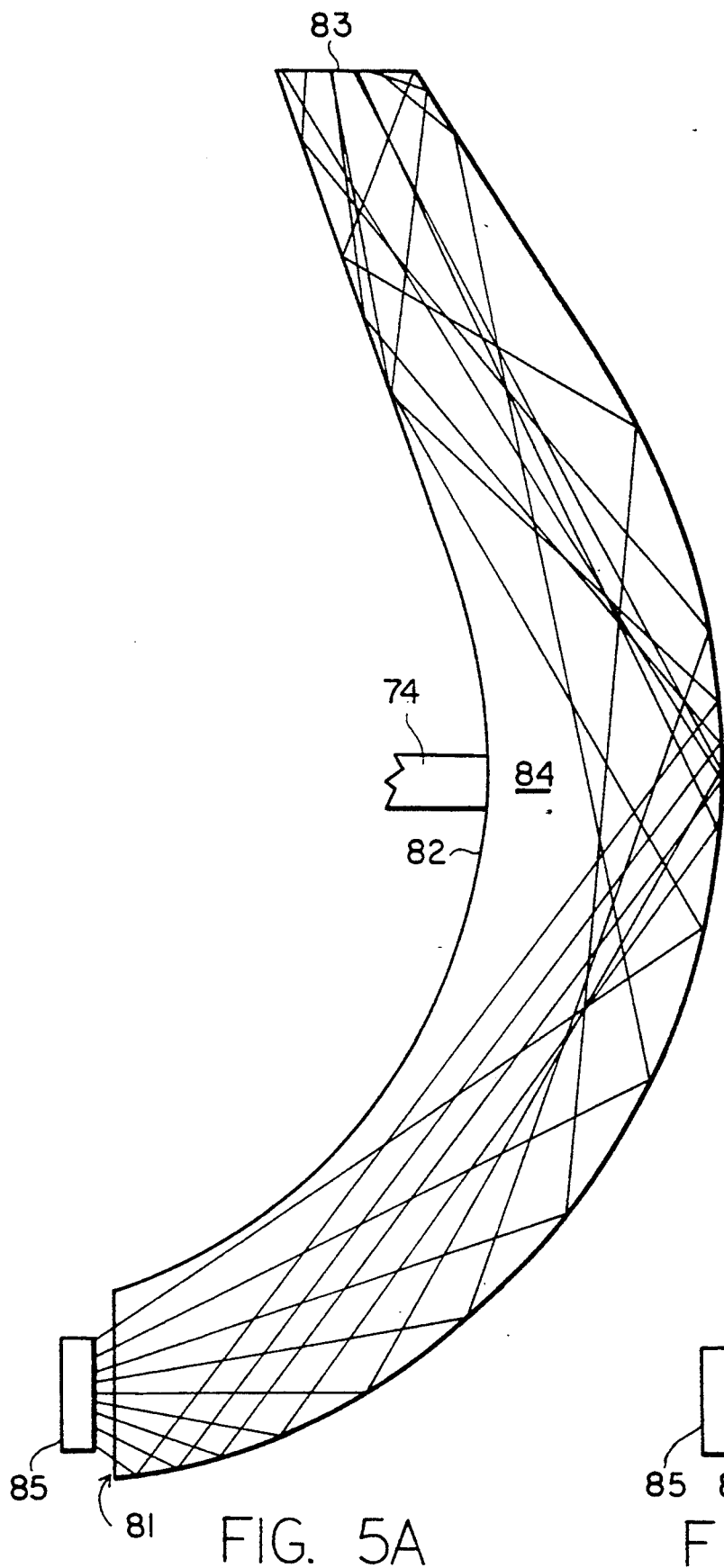
FIG. 5A is an enlarged cross-section view of a single light pipe which shows the radius of curvature, R, the maximum light pipe thickness, t, and the internal light transmission characteristics of the light pipe.
FIG. 5B shows an alternative LED mounting arrangement which may be used for the above light pipes.

Referring now to the light pipe cross section shown in FIG. 5A, the radius of curvature R shown therein is equal to, or greater than, three times the thickness dimension, t, at its point 82 of maximum thickness. The exact location of the light pipe surface region joining the rib support members 74 is not critical inasmuch as there will be very little light impinging on the inside surface of the light pipe wall adjacent to the light void region 84 as indicated in FIG. 5A. This light void region 84 is defined by the direction of the propagated light waves shown in FIG. 5A which emanate from the light emitting diode or LED 85 mounted closely adjacent to the lower flat surface 81 of the light pipe 44. These light waves are then reflected off of the inside surfaces of the light pipe 44 and in the various path directions shown to thereby ultimately be received at the upper end 83 of the light pipe which may either be of corrugated construction or of a preferred flat construction. Similarly, the flat end 81 of the light pipe 44 may if desired be changed to the parabolic construction and design 88 as indicated in FIG. 5B.

Various modifications may be made in and to the above described embodiment without departing from the spirit and scope of this invention. For example, the present invention may be also used in scanners and facsimile machines as well as printers or copiers, and it may be employed with a variety of LED configurations constructed on a major surface of a printed circuit board. Moreover, the present invention is not limited to the particular configuration and curvature of the plurality of light pipes or to the specific design of the one-piece molded construction of which the light pipes are an integral part. For example, the angled flange 59 may be made vertical if desired. In addition, the present invention is intended to cover the transmission of light from any type of PC board source to various types of display panels containing numbers, letters, symbols, or other types of display characters thereon. Finally, if desired, the PC board 28 may be mounted horizontally within the instrument housing 10 and used with the curved light pipes to project light onto a vertical front or side wall of the instrument housing on which a display panel is mounted. Accordingly, it is to be understood that the above and other similar design modifications are clearly within the scope of the following appended claims.

I claim:

1. Light transmission and alignment apparatus for electro-optically coupling to a display panel for an electronic instrument including, in combination:
   a. a plurality of light emitting diodes (LEDs) located on one major surface of a printed circuit board which is positioned substantially normal with respect to a display panel of an electronic instrument housing, and
   b. a plurality of curved light pipes electro-optically coupled between said light emitting diodes and said surface of said display panel.

2. The apparatus defined in claim 1 wherein said plurality of light pipes are joined to vertical and horizontal frame members of one piece molded construction and are operative to align said light pipes in all of the X, Y, and Z axes within said electronic instrument housing, wherein the X and Y axes define a plane normal to the display panel.

3. The apparatus defined in claim 2 wherein one of said frame members is fittable into a receiving slot in said printed circuit board to thereby align said light pipes in the X and Y directions.

4. The apparatus defined in claim 2 wherein a horizontal frame member aligns said light pipes on the X and Y axes and a pair of vertical frame members align said light pipes on the Z axis of said electronic instrument housing.

5. The apparatus defined in claim 4 wherein said light pipes are tapered from a large end where each LED is mounted and into a smaller end which optically couples to said display panel on said electronic instrument housing.

6. The apparatus defined in claim 1 wherein:
   a. said plurality of curved light pipes are adjoined to a horizontal support member which aligns said light pipes on X and Y axes of orientation within said electronic instrument housing, wherein the X and Y axes define a plane normal to the display panel, and
   b. a pair of upstanding rib members passing adjacent said horizontal support member for aligning said light pipes in the Z axis of orientation within said electronic instrument housing.

7. The apparatus defined in claim 6 wherein said horizontal support or platform member has an angularly extending end section for engaging a slot in said printed circuit board.

8. The apparatus defined in claim 7 wherein said upstanding rib members have a fixture plate at one end thereof for being secured to said instrument housing and a beveled edge at the other end thereof for contacting an edge of said printed circuit board and removing said light emitting diodes thereon a predetermined small space away from the adjacent end surfaces of said light pipes as required by assembly tolerances.

9. A curved light pipe for changing the path of light travel from a horizontal direction normal to a major surface of a printed circuit board upon which light emitting devices are mounted and by approximately 90° and then normal to a display panel on an outer surface of an electronic instrument housing, characterized in that: the radius of curvature, R, of said light pipe is equal to or greater than three times the maximum thickness, t, of said light pipe, or: $R \geq 3t$.

10. The light pipe defined in claim 9 wherein one end of said light pipe for engaging a light emitting device is either flat or parabolic, and the other, smaller end of said light pipe for propagating light to said display panel is either flat or corrugated or concaved or textured.

11. The invention defined in claim 10 which further includes support means attached to said light pipe at approximately the center of its 90° radius of curvature, whereby a minimum of transmitted light waves from said light emitting devices to said display panel impinge the walls of said light pipe in the region of attachment to said support member, thereby enhancing the light transmission efficiency of said light pipe.

12. The invention defined in claim 11 wherein a plurality of curved light pipes as defined are provided in a unitary structure characterized in that:
   a. said plurality of curved light pipes are adjoined to a horizontal support member which aligns said light pipes on X and Y axes of orientation within said electronic instrument housing, wherein the X and Y axes define a plane normal to the display panel, and
   b. a pair of upstanding rib members passing adjacent through or adjacent said horizontal support member for aligning said light pipes in the Z axis of orientation within said electronic instrument housing.

13. Apparatus for electro-optically coupling to a display for an electronic instrument comprising:
   a. a printed circuit board having a plurality of light emitting devices located on one major surface thereof and positioned within an electronic housing substantially normal with respect to a horizontal display panel on an outer surface of said housing,
   b. a plurality of curved light pipes electro-optically coupled between said light emitting devices and said display panel, and
   c. each of said light pipes being curved outwardly and upwardly from said light emitting devices for changing the path of light travel therein from a horizontal direction normal to a major surface of said printed circuit board and by approximately 90° to said display panel.

14. The apparatus defined in claim 13 wherein each light pipe is characterized in that its radius of curvature, R, is equal to or greater than three times the maximum thickness, t, of said light pipe, or $R \geq 3t$.

15. The apparatus defined in claim 14 wherein one end of each light pipe for engaging a light emitting device is either flat or parabolic, and the other smaller end of said light pipe is either flat or corrugated.

16. The invention defined in claim 15 which further includes means attached to each light pipe at approximately the center of its 90° radius of curvature, whereby a minimum of transmitted light waves from said light emitting device to said display panel impinge on the inside walls of said light pipe at its midpoint of curvature, thereby enhancing the light transmission efficiency of said light pipe.

17. The apparatus defined in claim 16 wherein said plurality of light pipes are joined to vertical and horizontal frame members of one piece molded construction, and said frame members are operative to align said light pipes in all the X, Y, and Z axes within said electronic instrument, wherein the X and Y axes define a plane normal to the display panel.

18. The apparatus defined in claim 17 wherein one of said frame members is fittable into a receiving slot in said printed circuit board to thereby align said light pipes in the X and Y directions.

19. The apparatus defined in claim 17 wherein a horizontal and angled frame member aligns said light pipes on X and Y axes and a pair of vertical frame members align said light pipes on the Z axis of said electronic instrument housing.

20. The apparatus defined in claim 19 wherein said light pipes are tapered from a large end where said light emitting devices are mounted and into a smaller end which optically couples to a lens on said display panel on said electronic instrument housing.

* * * * *